US008380675B1

(12) United States Patent
Dwivedi

(10) Patent No.: US 8,380,675 B1
(45) Date of Patent: Feb. 19, 2013

(54) MAILBOX ARCHIVING USING ADAPTIVE PATTERNS

(75) Inventor: Alok Dwivedi, Earley (GB)

(73) Assignee: Symantec Corporation, Mountain View, CA (US)

( * ) Notice: Subject to any disclaimer, the term of this patent is extended or adjusted under 35 U.S.C. 154(b) by 230 days.

(21) Appl. No.: 12/765,524

(22) Filed: Apr. 22, 2010

(51) Int. Cl.
*G06F 17/30* (2006.01)
*G06F 17/00* (2006.01)

(52) U.S. Cl. .......... 707/661; 709/207; 709/209; 710/15

(58) Field of Classification Search .................. 707/661; 709/207, 206; 710/15
See application file for complete search history.

(56) References Cited

U.S. PATENT DOCUMENTS

| | | | |
|---|---|---|---|
| 6,330,621 B1 * | 12/2001 | Bakke et al. ............ | 710/5 |
| 7,100,008 B2 | 8/2006 | Yagawa | |
| 7,155,633 B2 | 12/2006 | Tuma et al. | |
| 7,251,680 B2 * | 7/2007 | DeVos ................... | 709/206 |
| 7,328,366 B2 | 2/2008 | Michelman | |
| 8,024,415 B2 * | 9/2011 | Horvitz et al. ............ | 709/207 |
| 2004/0143636 A1 | 7/2004 | Horvitz et al. | |
| 2006/0010217 A1 | 1/2006 | Sood | |
| 2006/0161635 A1 | 7/2006 | Lamkin et al. | |

OTHER PUBLICATIONS

Gable, Julie; "What you Should Know About E-Mail Archiving"; Internet Article; Transform; Aug. 2004; http://www.transformmag.com/showArticle.jhtml?articleID=23905110; 4 Pages.

"Advanced Solutions for E-Mail Archiving"; Infrastructure Solutions; Network Appliance, Inc.; Copyright 2006; 2 Pages.

Rosen, Scott; "Enhancing Microsoft Exchange Migrations with VERITAS Enterprise Vault from Symantec"; Article; Dell Power Solutions; Aug. 2005; pp. 75-78.

"Symantec Enterprise Vault 7.0: Store, Manage, and Discover Critical Business Information"; Data Sheet; Symantec Corporation; Copyright 2006; 5 Pages.

U.S. Appl. No. 11/473,813, filed Jun. 23, 2006 Entitled "Computer System Employing an Adaptive Archival Process".

* cited by examiner

*Primary Examiner* — Yicun Wu
(74) *Attorney, Agent, or Firm* — Rory D. Rankin; Meyertons, Hood, Kivlin, Kowert & Goetzel, P.C.

(57) ABSTRACT

A system and method for processing electronic documents, such as emails, including archival operations. A method includes determining a historical usage of an email and updating a historical usage for a folder that is based on the historical usage of one or more emails included in the folder. For a given folder, an archival priority is set based on previous historical usage values of the one or more emails within the folder. The method sets an archival priority for each of the one or more emails comprised within the given folder that is based on the historical usage of the respective email and the given folder and additionally a single-instance-store (SIS) factor associated at least with a size and a number of copies of the respective email stored on a data storage medium. Emails are archived according to the archival priorities of the folders and then of the emails themselves.

21 Claims, 6 Drawing Sheets

MAILBOX ARCHIVING USING ADAPTIVE PATTERNS

BACKGROUND OF THE INVENTION

1. Field of the Invention

This invention relates to the field of computer processing and, more particularly, to the processing of electronic documents including archival operations.

2. Description of the Related Art

As computer memory storage and data bandwidth increase, so does the amount and complexity of data that business and industry daily manage. A large portion of the data involves corporate information managed for a company or workgroup by one or more servers. These hardware and software components of these servers provide employees and customers the ability to search and access the corporate information such as electronic documents, email messages, announcements, tasks, discussion topics, and so forth. A dedicated server, such as an electronic document server, manages electronic documents for an office by managing and storing both intra-office and external document transmissions. The electronic document server may provide each user of the system with one or more folders and subfolders for storing electronic documents. For example, an email message may be stored within an email folder on an email server.

Electronic documents, such as emails, may contain crucial information to a business, and therefore, may be archived, or backed up, to an archival storage system. The archival storage system may prevent loss or corruption of data included in the electronic documents. Archiving applications may be faced with the task of efficiently archiving hundreds of thousands of email messages every day. The number of users receiving email and the number of messages received daily by each user may be appreciable. In order not to overload a computer network during normal business hours, an IT administrator may configure the archival system to archive overnight on a daily or weekly basis.

The large amount of data contained within an email server may make efficient archiving difficult as the archival operations are constrained by time and bandwidth limitations. For example, an archival operation may be expected to complete within two hours each night. Thus, a certain amount of data may not be archived. Some archiving applications provide a static filtering method for determining whether an email message is to be archived. Based on a filtering decision, an email message may be ignored or designated for archival. A static filtering method is characterized by a predefined collection of rules, which does not change over time, being applied to the email messages. For example, a static filter may filter all email messages, or emails, sent from a particular sender. The resulting emails selected for archiving are not prioritized. More important emails may wait behind a large number of relatively unimportant emails during such an archiving process. This large number of unimportant emails may delay, or even block, the archiving of important emails.

In view of the above, improved systems and methods for the processing of electronic documents including archival operations are desired.

SUMMARY OF THE INVENTION

Systems and methods for processing electronic documents including archival operations.

In one embodiment, a method includes determining a historical usage of an electronic document by performing analysis on one or more attributes associated with the corresponding electronic document. In one embodiment, the electronic document is an email message. The method includes updating a historical usage value for a folder comprising one or more emails, wherein the update is based on the historical usage of the one or more emails comprised within. For a given folder, the method sets an archival priority for the given folder based on previous historical usage values of the one or more emails comprised within. The updated historical usage of the given folder may be used in a subsequent analysis. The method sets an archival priority for each of the one or more emails comprised within the given folder. This archival priority is based on at least the historical usage of the respective email and the given folder. This archival priority may also be based on a single-instance-store (SIS) factor for a respective email, wherein the SIS factor is associated at least with one or more of the following: a size of the respective email and a number of copies of the respective email stored on a data storage medium. The method further comprises archiving the emails from the data storage medium to an archival system so that the emails associated with folders with higher archival priorities are archived earlier in time than emails associated with folders with lower archival priorities.

These and other embodiments will be appreciated upon reference to the following description and accompanying drawings.

Figure 1:
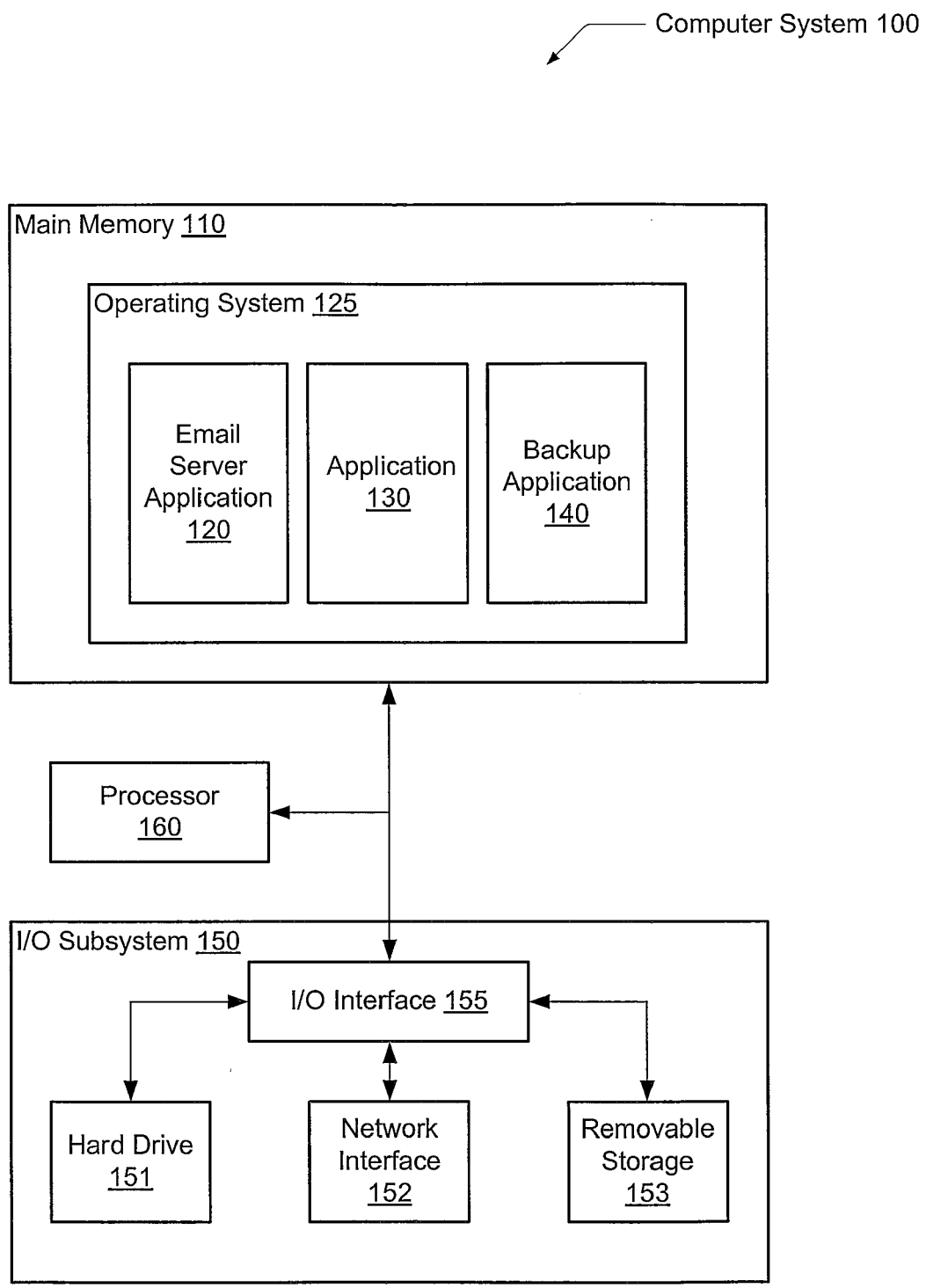
FIG. 1 is a generalized block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a computer system 100 is shown. Computer system 100 includes a processor 160 coupled to a main memory 110. Processor 160 and main memory 110 are in turn connected to an I/O subsystem 150, which comprises an I/O interface 155, a hard disk drive 151, a network interface 152, and a removable storage 153. Computer system 100 may be representative of a laptop, desktop, server, workstation, terminal, personal digital assistant (PDA) or any other type of computer system. In one embodiment, computer system 100 is representative of any number of servers hosting business-critical applications and database servers.

Processor 160 may utilize conventional processor design techniques such as complex branch prediction schemes, out-of-order execution, multi-threading, register renaming techniques, and so forth. Processor 160 may include circuitry for executing instructions according to a predefined instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, processor core 160 may access a cache memory subsystem for data and instructions. Core 100 may contain its own level 1 (L1) and level 2 (L2) caches in order to reduce memory latency. Alternatively, these cache memories may be coupled to processor cores 100 in a backside cache configuration or an inline configuration, as desired.

I/O interface 150 is operational to transfer data between processor 160 and/or main memory 110 and one or more internal or external components such as hard disk drive 151, network interface 152 and removable storage 153, as desired. For example, I/O interface 155 may embody a PCI bridge operable to transfer data from processor 160 and/or main memory 110 to one or more PCI devices. I/O interface 155 may additionally or alternatively provide an interface to devices of other types, such as SCSI devices and/or Fibre channel devices.

Hard disk drive 151 may be a non-volatile memory such as a magnetic media. Network interface 155 may be any type of network adapter, such as Ethernet, fiber optic, or coaxial adapters. Removable storage 153 is representative of a disk drive, optical media drive, tape drive, or other type of storage media, as desired.

In addition to the depicted hardware components, computer system 100 may additionally include various software components. For example, FIG. 1 illustrates an operating system 125 stored in main memory 110. Operating system 125 is representative of any of a variety of specific operating systems, such as, for example, Microsoft Windows®, Linux®, or Sun Solaris®. As such, operating system 125 may be operable to provide various services to the end user and provide a software framework operable to support the execution of various programs such as email server application 120, an archive application 140 (also referred to as a backup application), and any of a variety of other applications represented in the illustrated embodiment by application 130. It is noted that the depicted software components 120, 130 and 140 may be paged in and out of main memory 110 in a conventional manner from a storage medium such as hard drive 151.

In various embodiments, email server application 120 is operable to manage and maintain a plurality of electronic documents for a plurality of system users. In one embodiment, email server application 120 is operable to send and receive email to and from one or more external sources via the Internet, and to send and receive email between users via an intranet. As will be described below, email server application 120 may be operable to store email messages, in one or more folders and subfolders. Each email message, or email, may be owned or managed by one or more users. These emails may be stored in, and copied between, hard drive 151 and main memory 110, in accordance with the execution of email server application 120. Some of these email messages may be large markup language files, which contain image files, audio or video clips, spreadsheets or other large data files as attachments.

In one particular implementation, email server application 120 is embodied by the software product Microsoft Exchange Server® or a similar email server software application. It is noted that one or more client computers (not shown in FIG. 1) may be coupled via a network to computer system 100. The client computers may be equipped with a personal information manager application such as Microsoft Outlook®. The personal information manager application may be used as an email client software application that works with the applications Microsoft Exchange Server® and Microsoft Office SharePoint Server® for multiple users in an organization to manage shared mailboxes.

Archive application 140 is operable to archive copies of emails managed by email server application 120 on a data storage medium such as removable storage 153 (or any other type of archive storage). Alternatively, selected emails may be transferred to remote archive storage through network interface 152. Archiving application 140 may be faced with the task of efficiently archiving hundreds of thousands of emails every day. In various embodiments, archive application 140 may also restore emails acquired from previous archive operations. Archive application 140 may also be configured to provide other known archiving functionality, as desired, such as various features provided by Enterprise Vault® from Symantec Corporation.

As will be described in further detail below, in one embodiment, archive application 140 may be configured to perform an analysis of historical usage associated with a plurality of emails and their corresponding folders and subfolders. In addition, the analysis may make use of various factors for a given email such as a size of the given email, a number of recipients the given email is sent to, and a number of times the given email has been sent, forwarded and/or replied. This additional step may identify those emails, which include more sharing and hence may free up more space in an email server. Based upon this complete analysis, archive application 140 may assign archival rank scores to individual emails, which may then be used to prioritize archiving operations. The archival rank score may be applied to every message in a user's mailbox. The archival rank score may represent two factors that indicate how important it may be to archive a given email. One factor indicates how much the given email is shared among users in an organization. A second factor indicates how likely a particular user will use the message. A normalized score of these two factors may be created which decides the order in which the emails will be archived. Therefore, more storage space may be freed without affecting a user's work.

Figure 2:
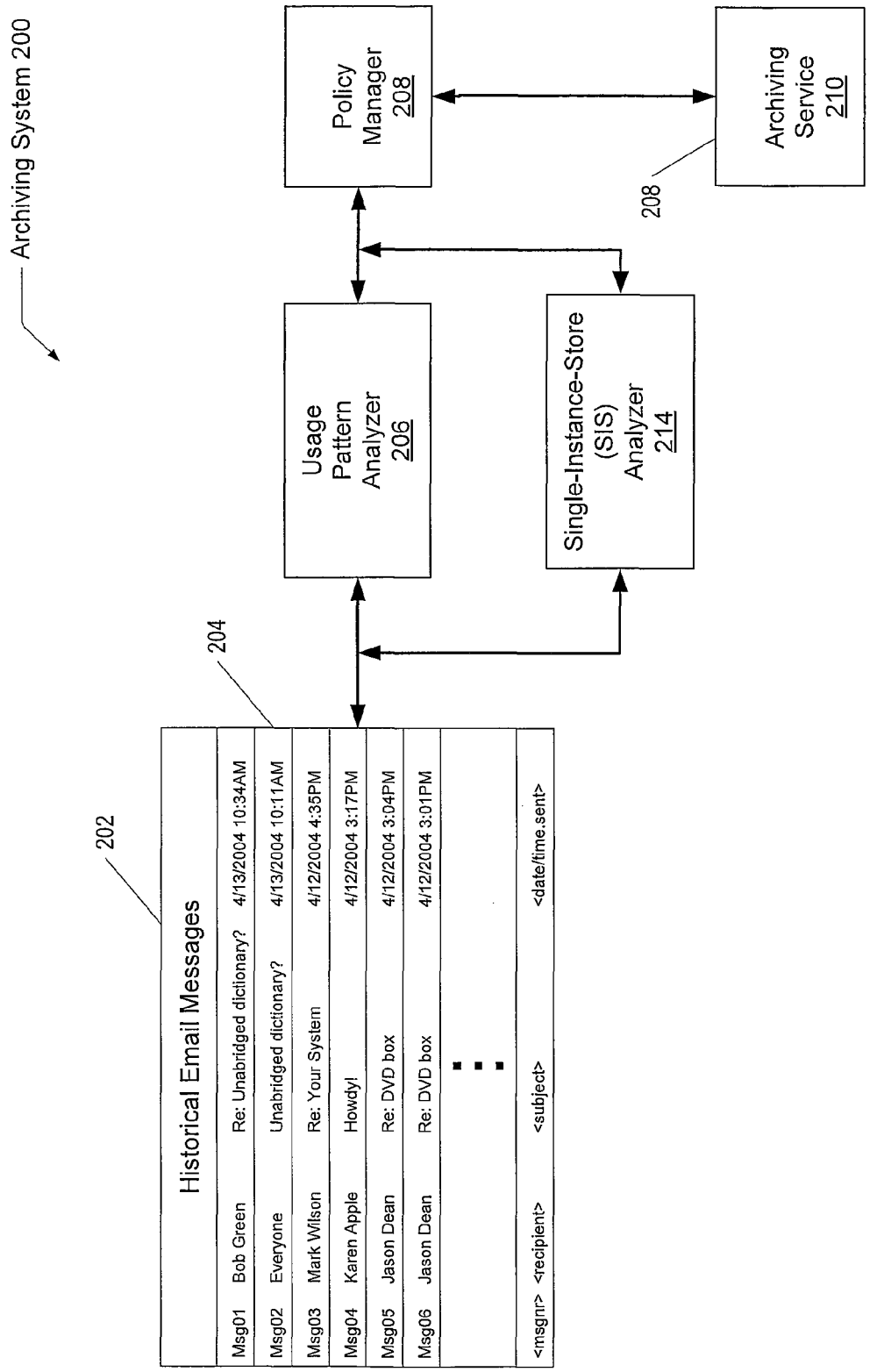
FIG. 2 is a generalized block diagram illustrating one embodiment of an archiving system.
Figure 3:
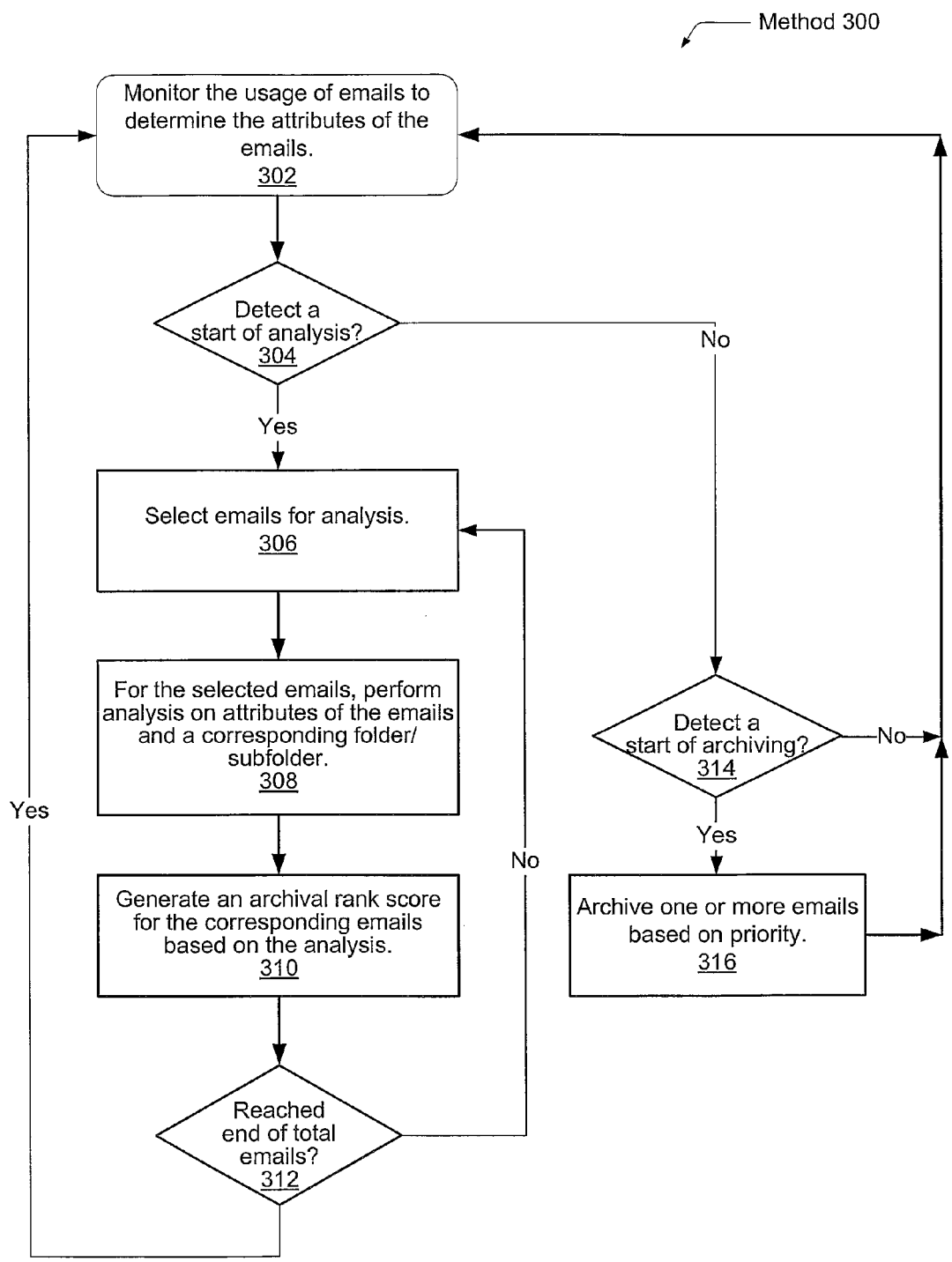
FIG. 3 is a generalized flow diagram illustrating one embodiment of a method for efficient archiving of electronic documents.

Turning now to FIG. 2, a generalized block diagram illustrating one embodiment of an archiving system 200 is shown. In one embodiment, the archiving system 200 may be used to archive electronic documents, such as email messages. In some embodiments, the functionality illustrated in FIG. 2 may be implemented in software, for example, provided within archive application 140 in FIG. 1. Referring to FIG. 3, one embodiment of a method 300 for efficient archiving of electronic documents is shown. The components embodied in archiving system 200 may generally operate in accordance with method 300. Referring collectively to archiving system 200 and method 300, a system and a method for efficient archiving of electronic documents, such as emails, is described here. It is noted for purposes of discussion, the steps in this embodiment of method 300 are described in sequential order. However, some steps may occur in a different order than shown, some steps may be performed concurrently, some steps may be combined with other steps, and some steps may be absent in another embodiment.

An email server application 120 may monitor the usage of emails 202 in step 302 by a given user who has received and/or sent the emails. The emails 202 may be grouped or organized in folders and subfolders by the given user. Statistics for a given email among the received emails 202 may be maintained by email server application 120. The statistics may include at least one or more of the following: a total number of times the given email is replied or forwarded, a number of times the given email is replied or forwarded during a predetermined last number of days, a number of predetermined high-weighted keywords within the given email, a number of predetermined high-weighted keywords within the subject line, a numerical value indicating a status of the user in a recipient's list (e.g., the user is the only recipient, the user is in a To: list or a CC: list, the user is in a distribution list), an age of the given email, a size of the given email, a number and a size of attachments in the given email, a delay in replying to or forwarding the given email, and so forth. In an alternate embodiment, if an email server application 120 is not used, a file system may have an add-on software application uploaded in order to collect statistics of corresponding emails.

An IT administrator may set up a background analysis procedure to occur a predetermined number of times a day, such as three times a day. The steps performed if one of the above preset times is not reached (conditional step 304) is described later. When one of these preset times is reached (conditional step 304), then in step 306, a usage pattern analyzer 206 may select for the background analysis a set of emails from the total set of emails 202 corresponding to a given user. The emails may be selected on a folder-by-folder basis, a day-by-day basis, a client account basis, a workgroup basis, or another criteria. The emails may be selected from emails sent or received by a corresponding user, or both. In addition, a set of emails may be based on emails from the last few days, weeks, or months (or over any other set or configurable time interval).

In step 308, the usage pattern analyzer 206 and the single-instance-store (SIS) analyzer 214 perform the background analysis on the attributes of the selected emails. The attributes may be the result of the monitoring performed in step 302. For example, preset times for background analysis may be set as 8 AM, noon, and 5 PM on weekly workdays. The monitoring of emails may end at noon for a background analysis to be performed at noon. However, monitoring continues for subsequent background analyses, such as an analysis to be performed at 5 PM. In one embodiment, a copy of the current statistics for selected emails may be saved in order to be later used for the background analysis. In another embodiment, the current statistics may be used although slight changes may occur during the background analysis. For example, an extra reply may occur for a particular email between the time the background analysis began and the time the analysis ended for that email.

In one embodiment, the attributes are monitored by emails server application 120 and stored in corresponding fields of the emails 202 and conveyed to the usage pattern analyzer 206 and the single-instance-store (SIS) analyzer 214. In another embodiment, the usage pattern analyzer 206 and the SIS analyzer 214 may perform monitoring of the emails 202 and generate corresponding attributes. In yet another embodiment, an add-on software application may perform the monitoring and storage of the attributes of the emails 202.

A normalized score may be assigned to an attribute such as a total number of times a given email is replied or forwarded. Each such attribute may be assigned a value between a predetermined range, such as 0 to 9, 1 to 10, or other. A predetermined range may be used to ensure that all the inputs used to calculate a final archiving score for a given email are normalized in a similar manner. Fuzzy rules may be used to assign a normalized value to a given attribute. The fuzzy rules may attempt to measure a user's usage pattern of respective emails. As the fuzzy rules improve, the algorithm producing the final archiving score additionally improves.

In one embodiment, the policy manager 208 adjusts the various rules and any associated weights that contribute to the archival rank score. The policy manager 208 may provide each of the usage pattern analyzer 206 and the SIS analyzer 214 with one or more corresponding rules. The usage pattern analyzer 206 applies the given rules and evaluates corresponding attributes associated with those rules to generate a usage factor (UF) for a given email and its corresponding folder or subfolder. Similarly, the SIS analyzer 214 applies the given rules and evaluates corresponding attributes associated with those rules to generate an archiving factor (AF) for a given email. A combination of the UF and the AF in step 310 may produce an archiving score for a given email.

The usage factor for a given email (UF) and the usage factor for a corresponding folder/subfolder (FUF) may indicate a "usage pattern", which represents information relating to the use of the given email and its corresponding folder/subfolder over a period of time. The particular attributes used to generate the usage pattern may vary from embodiment to embodiment, as desired, and in general may include any information associated with the usage of an email (or set of emails). In addition, when step 308 is repeated during a later preset time for background analysis (e.g., a 5 PM background analysis following a 12 PM background analysis), the usage pattern may be refreshed in a manner that reflects both a number of previous iterations of step 308 and the current iteration. Thus, the usage pattern may be heuristically updated based on previous analysis of the usage of emails. Upon refreshing the usage pattern, a dynamic view of the most recent emails and email conversations may be provided. As a result, rules may be adapted to "learn" from changes in the information that represents a usage pattern. For example, if a recipient does not read any email from a given sender, then after a certain amount of time, the archiving system 200 may assign a low archival rank score to emails from that sender. The result is these particular emails being excluded from archiving. After detecting this same usage pattern over a longer period of time, the archiving system 200 may suggest a policy change to the user, and/or begin to automatically delete emails received from that sender.

In one embodiment, four attributes may be used to determine a corresponding usage factor (UF) for an email. Each attribute may be assigned a normalized score by usage pattern analyzer 206 based on fuzzy rules provided by policy manager 208. A first attribute may be a total number of times the given email is replied or forwarded. A normalized score, such as between 0 and 9, may be assigned to this first attribute based on the total number found. A second attribute may be a number of times the given email is replied or forwarded during a predetermined last number of days. Again, a normalized score, such as between 0 and 9, may be assigned to this second attribute based on the number found.

Continuing with possible attributes to use in one embodiment to calculate a usage factor (UF) for a given email, a third attribute may be a numerical value indicating a status of the user in a recipient's list (e.g., the user is the only recipient, the user is in a To: list or a CC: list, the user is in a distribution list). A fourth attribute may be a number of predetermined high-weighted keywords within the subject line or a sum of products of the keywords and their respective weights. Again, the third and fourth attributes may each be assigned a normalized score, such as between 0 and 9. An arithmetic mean of the normalized values corresponding to the four attributes may be used to determine a respective UF value for a given email. If the four normalized values are indicated by S1-S4, then for a given email, $UF=(S1+S2+S3+S4)/4$. In other embodiments, a harmonic mean or a generalized mean may be used to determine UF for a given email.

For a same given email as described above, in one embodiment, three attributes may be used to determine a corresponding archiving factor (AF). Each attribute may be assigned a normalized score by the SIS analyzer 214 based on fuzzy rules provided by policy manager 208. A first and a second attribute may be a total size of the email and an age of the email, respectively. A normalized value, such as between 0 and 9, may be assigned to the first and the second attribute based on the values found. A third attribute comprising a SIS factor may comprise four subcategories. A first and a second subcategory may be a number of attachments and a total size of the attachments, respectively. A third subcategory may be a number of recipients belonging to a same mail server. A fourth subcategory may be a total number of times the given email is replied or forwarded to recipients belonging to a same mail server. In one embodiment, these four subcategories may be combined to create a third attribute. In another embodiment, each subcategory may be an additional individual attribute. A normalized value, such as between 0 and 9, may be assigned to a combination of the subcategories or to each individual subcategory.

Similar to deriving a usage factor (UF) for a given email, an arithmetic mean of the normalized values described above may be used to determine a respective AF value for a given email. In one embodiment, the four subcategories described above are combined to create a third attribute and the three normalized values may be indicated by S5-S7. Then for the given email, the archiving factor may be calculated as $AF=(S5+S6+S7)/3$. In other embodiments, a harmonic mean or a generalized mean may be used to determine AF for the given email.

Continuing with step 308 of method 300, in one embodiment, a corresponding UF value may be saved for later use. For example, a usage factor for a corresponding folder or subfolder may be computed. However, this folder usage factor (FUF) may depend on a UF value of each email stored within the folder or subfolder. Therefore, a UF value of each email stored within the folder or subfolder may be stored until all corresponding email UF values are available. When all corresponding email UF values are available, in one embodiment, a folder/subfolder usage factor (FUF) may be computed as a statistical mean of the UF values. The statistical mean may be an arithmetic mean, a harmonic mean, or a form of a generalized mean.

The FUF value may indicate a historical usage factor of a corresponding folder or subfolder. This updated/determined FUF value may be used in a subsequent background analysis as described later. The current value for the folder/subfolder's usage factor (FUF), which was found from a previous background analysis, may be used in a current computation of an archiving score for each email stored within the folder or subfolder. For example, a current value of a folder's FUF value may be 4.7, which was found during a previous background analysis that was performed at 8 AM. During a current background analysis at noon, an updated folder's FUF value may be found to be 6.9. The updated FUF value of 6.9 may, for example, be an arithmetic mean of the UF values determined at noon of all of the emails stored under the folder. The current FUF value of 4.7 may be an arithmetic mean of the UF values determined at 8 AM of all of the emails stored under the folder. The updated FUF value of 6.9 may be used in a subsequent background analysis, such as at 5 PM. The current FUF value of 4.7, which was determined at 8 AM, may be used at noon to determine current values at noon of archiving scores for each email stored within the folder.

In step 310 of method 300, any one of the blocks 206, 208, and 214 may receive the corresponding computed UF and AF factor values for all selected emails. Continuing with the above example, the computed UF and AF values for the selected emails may have been found at the current preset time of noon. The block 206, 208 or 214 that receives these values may generate an archival rank score for each email. This archival rank score may correspond to an archiving priority. The steps for determining the archival rank score is further described later. If an end of the emails to select has been reached (conditional step 312), then control flow of method 300 returns to step 302. Otherwise, control flow of method 300 returns to step 306.

Returning to conditional step 304, if one of the above preset times for background analysis is not reached (conditional step 304), then an archiving process may be or not be occurring. If an archiving request is detected (conditional step 314), then in step 316, both the archival rank scores for emails and the usage factors (FUFs) of corresponding folders/subfolders may be conveyed to the archiving service 210. The archiving service 210 may prioritize the archiving of one or more emails based on both the archival rank scores and the corresponding FUF values of corresponding folders/subfolders. For example, in one embodiment, the folders/subfolders may be prioritized based on their FUF values. The folders/subfolders with a higher FUF value may have a higher priority for archiving. Corresponding emails within a high priority folder/subfolder may be subsequently prioritized based on their archival rank scores.

One further example of prioritized archiving is archiving in real-time based on the archival rank scores provided in step 310. In different embodiments, various methods may be used to determine which emails to archive in real-time. In one exemplary embodiment, the policy manager 208 provides the archiving service 210 with a threshold priority value. Any emails with an archival rank score corresponding to a higher priority than the threshold priority value may be archived in real-time by the archiving service 210. Emails with higher archival rank scores may be archived first. In one implementation, system throughput constraints may be applied to restrict the range of archival rank scores present, thereby restricting the number of messages accepted for real-time archiving. In another embodiment, a fixed number of emails may be accepted for real-time archiving, and the threshold archival rank score adjusted accordingly. In yet further embodiments, normalization may be performed on the archival rank score for prioritization of emails before archiving.

Continuing with various methods that may be used to determine which emails to archive in real-time, the policy manager 208, in a further embodiment, may translate a calculated archival rank score into a priority ranking value. This priority ranking value may be provided to the archiving service 210. In various embodiments, the archiving service 210 may be responsible for prioritizing and executing corresponding archival operations according to the computed archival rank scores or the priority ranking values.

Figure 4:
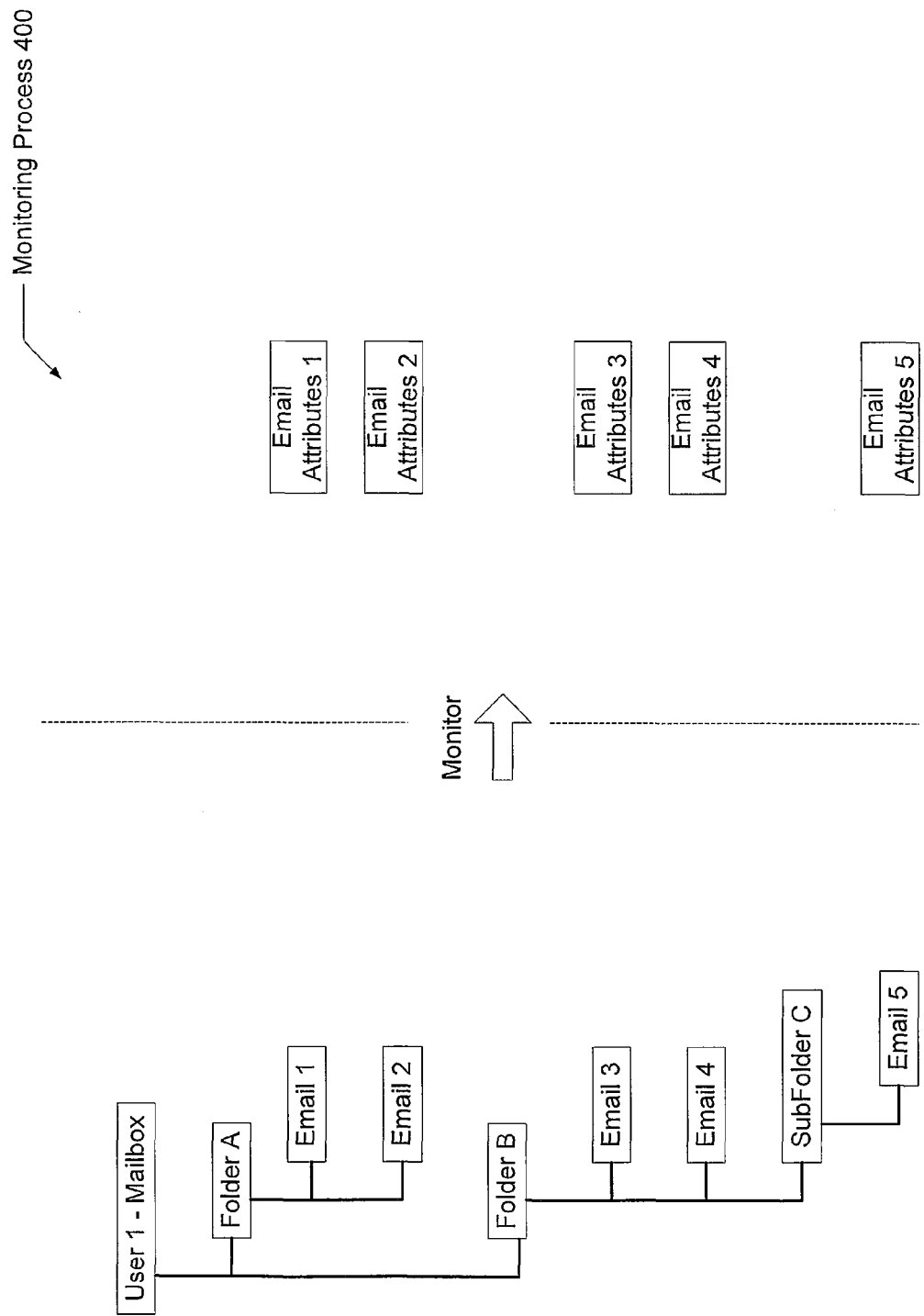
FIG. 4 is a generalized block diagram illustrating one embodiment of a monitoring process for computing attributes corresponding to electronic documents.

Referring now to FIG. 4, a generalized block diagram illustrating one embodiment of a monitoring process 400 for computing attributes corresponding to electronic documents is shown. In one embodiment, the electronic documents are emails in a user's mailbox. In the simplified example shown, two emails, email1 and email2 are organized under Folder A. Two additional emails, email3 and email4, are organized under Folder B. Folder B also comprises a Subfolder C. Subfolder C comprises a single email5. Corresponding information for each email is not shown for sake of simpler illustration. This corresponding information may include similar information shown in emails 202 of FIG. 2 such as at least a time stamp, a sender email address, one or more recipient's email addresses, an email size, an indication of any attachments, and so forth. Between each predetermined point-of-time for a background analysis, monitoring of the statistics of the emails occurs as described for step 302 of method 300 above. Corresponding email attributes may be maintained such as email attributes 1 to email attribute 5. These email attributes may be used during a background analysis as described above for step 308 of method 300.

Figure 5:
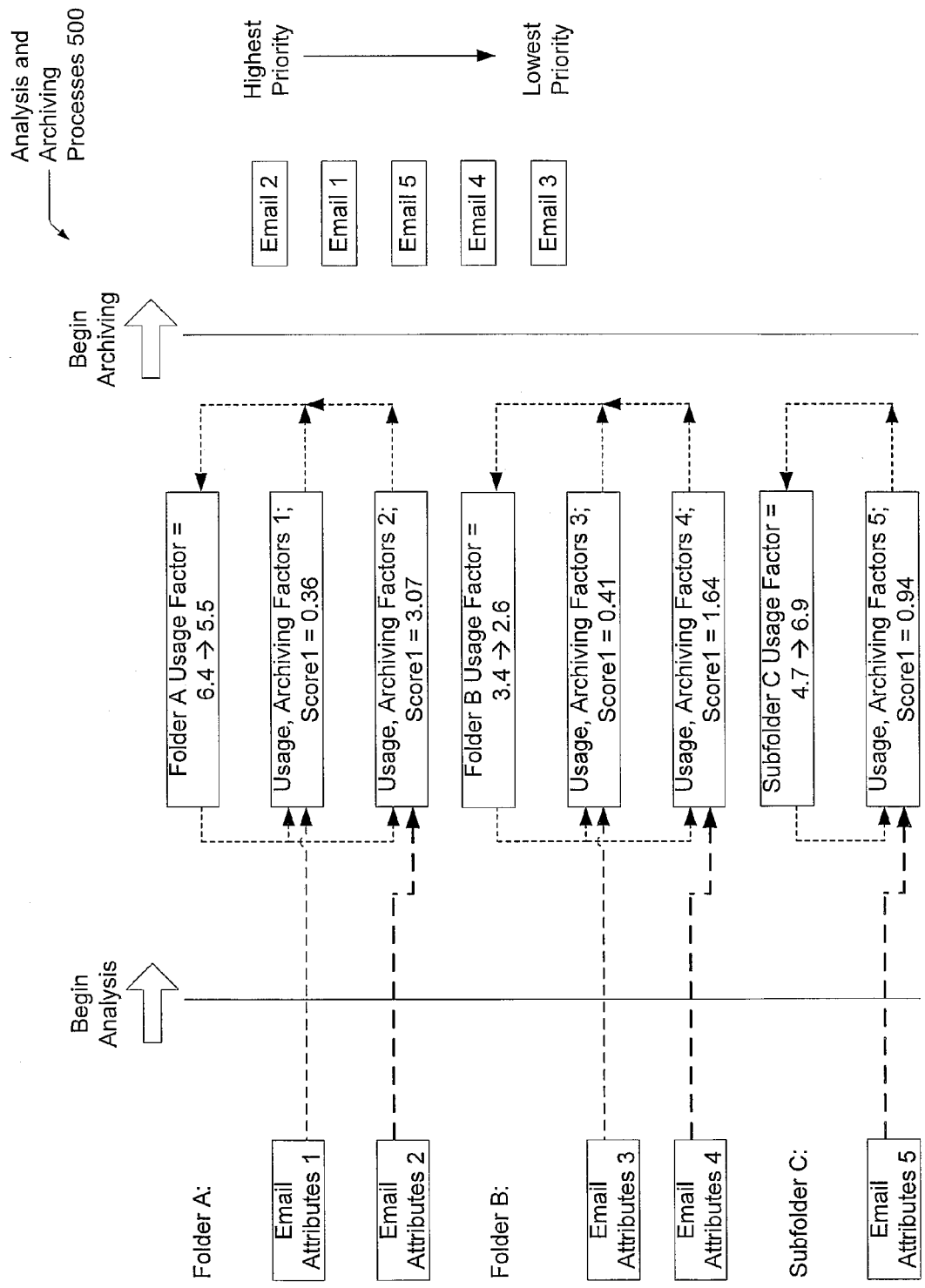
FIG. 5 is a generalized block diagram illustrating one embodiment of an analysis and archiving process for efficient archiving of electronic documents.

Turning now to FIG. 5, a generalized block diagram illustrating one embodiment of an analysis and archiving process 500 for efficient archiving of electronic documents is shown. In one embodiment, the electronic documents are emails in a user's mailbox. In the simplified example shown, the email attributes found in the monitoring process 400 are used as inputs to a background analysis as described above for step 308 of method 300. As shown, the email attributes are used to compute corresponding values for a usage factor (UF) and an archiving factor (AF). In addition, a corresponding folder or subfolder's usage factor (FUF) is used to compute an archival rank score. The email usage factor (UF) may be used to update the folder/subfolder's usage factor (FUF). Sample embodiments of these steps are provided shortly. One or more iterations of a background analysis may occur before an archiving process is begun. For example, in one embodiment, an IT administrator may schedule three times during a workday for a background analysis to occur. Then overnight, an archiving process may be initiated.

As shown in FIG. 5, in one embodiment, the folder usage factors (FUF) may be used to perform a first sorting of the emails. The values before any updates of the FUFs may be used by the archiving service 210 to perform an initial sort of the emails for archiving. In one embodiment, the parent-child relationships between folders and subfolders may be ignored. In the example shown, Folder A has a highest priority with a FUF value of 6.4 before any updates to the FUF value. This value of 6.4 shown in the example may be used to compute the corresponding archival rank scores of 0.36 for email1 and 3.07 for email2. The Subfolder C may be next in priority with a FUF value of 4.7 before any updates to the FUF value. This value of 4.7 shown in the example may be used to compute the corresponding archival rank score of 0.94 for email5.

Continuing with the archiving priority of the folders/subfolders shown in FIG. 5, the Folder B may have the lowest priority with a FUF value of 3.4 before any updates to the FUF value. This value of 3.4 shown in the example may be used to compute the corresponding archival rank scores of 0.41 for email3 and 1.64 for email4. Beginning with the highest priority folder, Folder A with folder usage factor of 6.4, the emails email1 and email2 are compared and sorted according to archiving priority. The first email, email1, has an archival rank score of 0.36. This score is lower than the corresponding score for the second email, email2, which has an archival rank score of 3.07. Therefore, email2 has the highest archiving priority of all emails in the shown mailbox. Email1 has the second highest archiving priority of all emails in the shown mailbox.

Subfolder C has the next highest archiving priority among the folders/subfolders. In the example shown, Subfolder C has only one email, email5. Therefore, this email, email5, has the next highest archiving priority of all emails in the shown mailbox. Finally, Folder B has the lowest archiving priority among the folders/subfolders. The email, email4, has a higher archival rank score than email3. Therefore, the last two emails to be sorted are arranged with email4 having a higher archiving priority than email3 as shown in FIG. 5. Again, threshold values, email sizes, email time stamps, and other criteria may be used to determine which of the emails, email1 to email5, are actually archived during an archival process.

Figure 6:
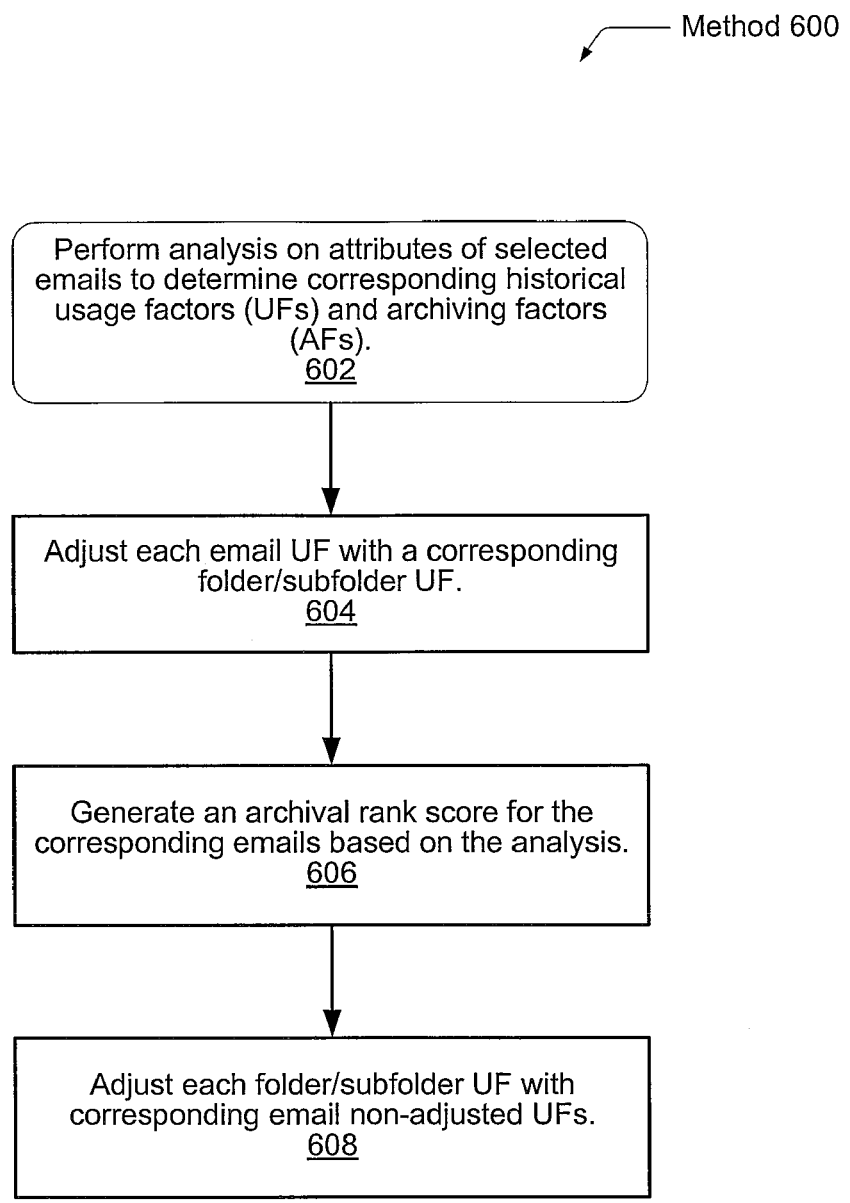
FIG. 6 is a generalized flow diagram illustrating another embodiment of a method for efficient archiving of electronic documents.

Turning now to FIG. 6, one embodiment of a method 600 for efficient archiving of electronic documents is shown. The components embodied in archiving system 200 may generally operate in accordance with method 600. It is noted for purposes of discussion, the steps in this embodiment of method 600 are described in sequential order. However, some steps may occur in a different order than shown, some steps may be performed concurrently, some steps may be combined with other steps, and some steps may be absent in another embodiment.

In step 602, the usage pattern analyzer 206 performs analysis on attributes of selected emails to determine corresponding historical usage factors (UFs). The SIS analyzer 214 performs analysis on attributes of selected emails to determine corresponding archiving factors (AFs). The usage pattern analyzer 206 and the SIS analyzer 214 perform analysis as discussed earlier regarding step 308 of method 300. In step 604, the usage pattern analyzer 206 may adjust a usage factor (UF) of each email corresponding to a given folder. In one embodiment, a net usage factor (NUF) for each email is computed by performing an arithmetic mean of the email's UF value and the given folder's FUF value, or NUF=(UF+FUF)/2.

In step 606, for each email, an archival rank score is computed. The archival rank score may also be referred to as a net archiving factor (NAF). The net archiving factor (NAF) may be computed with a weighted arithmetic mean, such as NAF= (W1*AF−W2*NUF)/(W1+W2). Here, the first weight, W1, is the weight of the archiving factor (AF) of the email, which includes the SIS factor. The second weight, W2, is the weight of the net usage factor (NUF) of the email. The initial values for the two weights, W1 and W2, may be set to 1. During each iteration of the background analysis, these weights may be adjusted with W1 increasing at a faster rate than W2. In one embodiment, if a negative value is found for the net archiving factor (NAF), then a value of zero may be used. The NAF values may be used later by the archiving service 210 to prioritize and sort emails for archiving after corresponding folders/subfolders have been prioritized and sorted.

In step 608, the usage factor (FUF) of a corresponding folder/subfolder may be adjusted with the new usage factors (UFs) of the emails comprised within the folder/subfolder. In one embodiment, an adjusted FUF is computed as an arithmetic mean of the new UF values of the emails comprised within the folder/subfolder. In other embodiments, a harmonic mean, a generalized mean, a weighted arithmetic mean, and so forth, may be used to determine an adjusted value for the folder's FUF value.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method comprising:
    determining a first usage factor for each of a plurality of electronic documents indicating historical usage of each of the plurality of electronic documents, said plurality of electronic documents being stored in a plurality of folders;
    determining a second usage factor for each of the plurality of folders, wherein a second usage factor for a given folder is based at least in part on one or more electronic documents stored within the given folder;
    updating a second usage factor for each of a plurality of folders indicating historical usage of each of the plurality of folders;
    for each folder of the plurality of folders setting an archival priority for a selected folder based at least in part on a previously determined usage factor for the selected folder; and
    for each electronic document within each folder of the plurality of folders, setting an archival priority for a given document based at least in part on:
        a usage factor of the given document and a usage factor of the selected folder; and
        a single-instance-store (SIS) factor which indicates at least one of a number of times the electronic document has been replied to or forwarded, and a number of recipients of the electronic document.

2. The method as recited in claim 1, further comprising setting the archival priority for each of the plurality of electronic documents by further using a single-instance-store (SIS) factor for a respective electronic document, wherein the SIS factor is associated with at least one or more of the following: a size of the respective electronic document, and a number of copies of the respective electronic document stored on a data storage medium.

3. The method as recited in claim 2, wherein the plurality of electronic documents are a plurality of emails and a respective first usage factor is associated with at least one or more of the following: a number of times the given email is replied to or forwarded, a number of times the given email is replied to or forwarded during a predetermined number of days, and a number of predetermined high-weighted keywords within the given email.

4. The method as recited in claim 1, wherein for purposes of identifying electronic documents for archiving, the method further comprising reviewing electronic documents within a first folder of the plurality of folders prior to reviewing electronic documents in a second folder of the plurality of folders, in response to determining the first folder has a higher archival priority than the second folder.

5. The method as recited in claim 4, further comprising archiving a first electronic document within the first folder prior to archiving a second electronic document within the first folder, in response to determining the first electronic document has a lower usage factor than the second electronic document.

6. The method as recited in claim 4, wherein at least one folder of the plurality of folders comprises one or more subfolders, and the method further comprises updating a respective usage factor for each of the one or more subfolders indicating historical usage of a corresponding subfolder, wherein the respective usage factor is based at least in part on a usage factor for each of the plurality of electronic documents associated with the corresponding subfolder.

7. The method as recited in claim 5, wherein for each subfolder of the one or more subfolders, the method further comprising:
    setting an archival priority for a given subfolder based on a previously determined usage factor for the given subfolder; and
    setting an archival priority for each of the plurality of electronic documents associated with the given subfolder based at least in part on the respective usage factor and the previously determined usage factor for the given subfolder.

8. The method as recited in claim 7, further comprising archiving the plurality of electronic documents to an archival system such that electronic documents associated with subfolders with higher archival priorities are archived earlier in time than electronic documents associated with subfolders and folders with lower archival priorities.

9. The method as recited in claim 1, wherein each of the first usage factor and the second usage factor represents a value which has been normalized, and wherein each archival priority of an electronic document is based on an arithmetic combination of a first usage factor and a second usage factor.

10. A computer system comprising:
    a data storage medium configured to store a plurality of electronic documents, wherein one or more of the plurality of electronic documents is associated with a folder of a plurality of folders; and
    a processor, wherein the processor is configured to:
        determining a first usage factor for each of a plurality of electronic documents indicating historical usage of each of the plurality of electronic documents, said plurality of electronic documents being stored in a plurality of folders;
        updating a second usage factor for each of a plurality of folders indicating historical usage of each of the plurality of folders;
        for each folder of the plurality of folders setting an archival priority for a selected folder based at least in part on a previously determined usage factor for the selected folder; and
        for each electronic document within each folder of the plurality of folders, setting an archival priority based at least in part on a usage factor of the given document and a usage factor of the selected folder, and a single-instance-store (SIS) factor which indicates at least one of a number of times the electronic document has been replied to or forwarded, and a number of recipients of the electronic document.

11. The computer system of claim 10, wherein the processor is further configured to set the archival priority for each of the plurality of electronic documents by further using a single-instance-store (SIS) factor for a respective electronic document, wherein the SIS factor is associated with one or more of the following: a size of the respective electronic document, and a number of copies of the respective electronic document stored on a data storage medium.

12. The computer system of claim 11, wherein the plurality of electronic documents are a plurality of emails and a respective first usage factor is associated with at least one or more of the following: a number of times the given email is replied to or forwarded, a number of times the given email is replied to or forwarded during a predetermined number of days, and a number of predetermined high-weighted keywords within the given email.

13. The computer system of claim 10, wherein for purposes of identifying electronic documents for archiving, the processor is further configured to review electronic documents within a first folder of the plurality of folders prior to reviewing electronic documents in a second folder of the plurality of folders, in response to determining the first folder has a higher archival priority than the second folder.

14. The computer system of claim 13, wherein the processor is further configured to archive a first electronic document within the first folder prior to archiving a second electronic document within the first folder, in response to determining the first electronic document has a lower usage factor than the second electronic document.

15. The computer system of claim 13, wherein at least one folder of the plurality of folders comprises one or more subfolders, and the method further comprises updating a respective usage factor for each of the one or more subfolders indicating historical usage of a corresponding subfolder, wherein the respective usage factor is based at least in part on a usage factor for each of the plurality of electronic documents associated with the corresponding subfolder.

16. The computer system of claim 15, wherein for each subfolder of the one or more subfolders the processor is further configured to:
   set an archival priority for a given subfolder based on a previously determined usage factor for the given subfolder; and
   set an archival priority for each of the plurality of electronic documents associated with the given subfolder based at least in part on the respective usage factor and the previously determined usage factor for the given subfolder.

17. The computer system of claim 16, wherein the processor is further configured to archive the plurality of electronic documents to an archival system such that electronic documents associated with subfolders with higher archival priorities are archived earlier in time than electronic documents associated with subfolders and folders having lower archival priorities.

18. A computer-readable storage medium storing program instructions, wherein the program instructions are executable by the processor to:
   a first usage factor for each of a plurality of electronic documents indicating historical usage of each of the plurality of electronic documents, said plurality of electronic documents being stored in a plurality of folders;
   determine a second usage factor for each of the plurality of folders, wherein a second usage factor for a given folder is based at least in part on one or more electronic documents stored within the given folder;
   update a second usage factor for each of a plurality of folders indicating historical usage of each of the plurality of folders;
   for each folder of the plurality of folders setting an archival priority for a selected folder based at least in part on a previously determined usage factor for the selected folder;
   for each electronic document within each folder of the plurality of folders, setting an archival priority for a given document based at least in part on a usage factor of the given document and a usage factor of the selected folder; and
   a single-instance-store (SIS) factor which indicates at least one of a number of times the electronic document has been replied to or forwarded, and a number of recipients of the electronic document.

19. The computer-readable storage medium of claim 18, wherein the program instructions are further executable to set said archival priority for each of the plurality of electronic documents by further using a single-instance-store (SIS) factor for a respective electronic document, wherein the SIS factor is associated with at least one or more of the following: a size of the respective electronic document and a number of copies of the respective electronic document stored on a data storage medium.

20. The computer-readable storage medium of claim 19, wherein the plurality of electronic documents are a plurality of emails and a respective first usage factor is associated with at least one or more of the following: a number of times the given email is replied to or forwarded, a number of times the given email is replied to or forwarded during a predetermined number of days, and a number of predetermined high-weighted keywords within the given email.

21. The computer-readable storage medium of claim 18, wherein for purposes of identifying electronic documents for archiving, the program instructions are further executable to review electronic documents within a first folder of the plurality of folders prior to reviewing electronic documents in a second folder of the plurality of folders, in response to determining the first folder has a higher archival priority than the second folder.

* * * * *